(12) United States Patent
Oroskar et al.

(10) Patent No.: US 11,019,547 B1
(45) Date of Patent: May 25, 2021

(54) CONTROLLING HANDOVER PARAMETERS BASED ON TARGET BASE STATION CHARACTERISTICS

(71) Applicant: Sprint Spectrum L.P., Overland Park, KS (US)

(72) Inventors: Siddharth S. Oroskar, Overland Park, KS (US); Kurt M. Landuyt, Parkville, MO (US); Vanil Parihar, Overland Park, KS (US); Jasinder P. Singh, Olathe, KS (US)

(73) Assignee: Sprint Spectrum L.P., Overland Park, KS (US)

( * ) Notice: Subject to any disclaimer, the term of this patent is extended or adjusted under 35 U.S.C. 154(b) by 252 days.

(21) Appl. No.: 15/287,559

(22) Filed: Oct. 6, 2016

(51) Int. Cl.
*H04W 36/30* (2009.01)
*H04W 24/10* (2009.01)
*H04W 36/00* (2009.01)
*H04W 88/08* (2009.01)

(52) U.S. Cl.
CPC .......... *H04W 36/30* (2013.01); *H04W 24/10* (2013.01); *H04W 36/0088* (2013.01); *H04W 88/08* (2013.01)

(58) Field of Classification Search
CPC ..... H04W 36/16; H04W 36/22; H04W 40/36; H04W 28/0284; H04W 28/0289; H04W 28/08; H04W 72/0486; H04W 72/1252; H04W 36/30; H04W 36/0088; H04W 24/10; H04W 88/08
See application file for complete search history.

(56) References Cited

U.S. PATENT DOCUMENTS

| | | | |
|---|---|---|---|
| 8,848,688 B1* | 9/2014 | Wurtenberger | H04W 36/00837 370/351 |
| 2012/0028627 A1* | 2/2012 | Hunzinger | H04W 36/0085 455/422.1 |
| 2013/0077599 A1* | 3/2013 | Dimou | H04W 36/22 370/331 |
| 2013/0170362 A1* | 7/2013 | Futaki | H04W 24/02 370/241.1 |
| 2014/0064158 A1* | 3/2014 | Timus | H04W 36/30 370/279 |

(Continued)

OTHER PUBLICATIONS

Saleh, Ahmad N., U.S. Appl. No. 15/170,080, filed Jun. 1, 2016, 40 pages.

(Continued)

*Primary Examiner* — Charles C Jiang
*Assistant Examiner* — Voster Preval (57) ABSTRACT

A method and system to control UE handover is disclosed herein. A source base station serving a UE receives from the UE a measurement report that specifies a signal strength of a neighboring target base station. The source base station sets a value of a handover threshold parameter, with the set value being based at least in part on whether the target base station is a relay base station or a non-relay base station. Further, the source base station may compare the specified signal strength of the target base station to the set value of the handover threshold parameter and determine that a handover condition is satisfied. Responsive to making such a determination, the source base station may invoke handover of the UE from the source base station to the target base station.

20 Claims, 4 Drawing Sheets

(56) References Cited

U.S. PATENT DOCUMENTS

| | | | | |
|---|---|---|---|---|
| 2015/0237546 A1* | 8/2015 | Lin | ................... | H04W 36/0083 |
| | | | | 455/436 |
| 2016/0309360 A1* | 10/2016 | Noldus | ................... | H04L 43/16 |
| 2017/0055197 A1* | 2/2017 | Shukair | ............... | H04W 36/165 |
| 2017/0118690 A1* | 4/2017 | Patel | ................. | H04W 36/0061 |
| 2018/0049079 A1* | 2/2018 | Ozturk | ................. | H04W 48/16 |
| 2019/0007876 A1* | 1/2019 | Zhu | ....................... | H04W 36/08 |
| 2019/0082362 A1* | 3/2019 | Xu | ................... | H04W 36/0027 |
| 2019/0110237 A1* | 4/2019 | Cha | ................... | H04W 36/0083 |

OTHER PUBLICATIONS

Singh, Jasinder P., U.S. Appl. No. 13/860,275, filed Apr. 10, 2013, 39 pages.

* cited by examiner

CONTROLLING HANDOVER PARAMETERS BASED ON TARGET BASE STATION CHARACTERISTICS

BACKGROUND

A typical wireless communication system includes a number of base stations each radiating to provide coverage in which to serve user equipment devices (UEs) such as cell phones, tablet computers, tracking devices, embedded wireless modules, and other wirelessly equipped devices, whether or not user operated. In turn, each base station may sit as a node on a core access network that includes entities such as a network controller, switches, and/or gateways, and the core network may provide connectivity with one or more external transport networks such as the public switched telephone network (PSTN) and the Internet. With this arrangement, a UE within coverage of the system may engage in air interface communication with a base station and may thereby communicate via the base station with various remote network entities or with other UEs served by the base station.

Such a system may operate in accordance with a particular radio access protocol, examples of which include, without limitation, Long Term Evolution (LTE) (using orthogonal frequency division multiple access (OFDMA) and single-carrier frequency division multiple access (SC-FDMA)), Code Division Multiple Access (CDMA) (e.g., 1×RTT and 1×EV-DO), Global System for Mobile Communications (GSM), IEEE 802.11 (WIFI), and BLUETOOTH. Each protocol may define its own procedures for registration of UEs, initiation of communications, handover between base station coverage areas, and other functions.

Further, each base station may provide wireless service to UEs on one or more carrier frequencies, with the air interface defining various downlink and uplink channels. For instance, on the downlink, the air interface may define a reference channel for carrying a reference signal that UEs can measure to evaluate base station coverage strength, the air interface may define various other downlink control channels for carrying control signaling to UEs, and the air interface may define one or more downlink traffic channels for carrying bearer data and other information to UEs. And on the uplink, the air interface may define an access channel for carrying UE access requests to the base station, the air interface may define one or more other uplink control channels for carrying control signaling to the base station, and the air interface may define one or more uplink traffic channels for carrying bearer data and other information to the base station.

When a UE initially enters into coverage of such a system, the UE may scan for a strongest base station coverage area in which to operate, and the UE may then engage in signaling with and via the base station, to register for service. The UE may then be served by the base station in a connected state in which the UE has an established radio-link-layer connection with the base station through which the UE and base station may exchange bearer data (e.g., application-layer communications), facilitating communication by the UE on the external transport network for instance.

When so served, the UE may also regularly monitor coverage strength from its serving base station and from adjacent base stations, to help ensure that the UE is served with sufficiently strong coverage and perhaps with the strongest available coverage. If the UE's coverage from its serving base station becomes threshold weak and if another base station's coverage becomes threshold strong (e.g., threshold stronger than the serving base station's coverage or than a defined level), then the UE may engage in signaling with its serving base station, and the serving base station may take action to coordinate handover of the UE to the other base station.

OVERVIEW

When a UE's serving base station is faced with the question of whether to coordinate handover of the UE to a target base station, the serving base station, also referred to as the source base station, may take into account a signal strength of the target base station, as detected by the UE. For example, the UE may monitor coverage of the target base station to determine a signal power strength (e.g., a signal-to-noise ratio or the like) from the target base station, and the UE may report this signal strength measurement to the serving base station. The UE may similarly determine a signal power strength of the serving base station and report this measurement to the serving base station as well. The serving base station, in turn, can then determine whether to initiate handover of the UE to the target base station based on these reported strength measurements. In particular, the serving base station may decide to initiate handover of the UE only if the measured signal strength of the target base station is at least threshold strong or at least threshold stronger than the measured signal strength of the serving base station.

In order to make such a determination, the serving base station may set a value of a handover threshold parameter for comparison with the signal strength of the target base station. In some situations, the handover threshold parameter could be a predetermined fixed value of a signal strength (e.g., in dB or dBm), such that comparing the signal strength of the target base station to the handover threshold parameter involves comparing the signal strength of the target base station to the fixed value. In other situations, the handover threshold parameter could be defined based on the reported strength of the serving base station. For example, the handover threshold parameter could be defined by applying an offset to the reported signal strength of the serving base station, such that comparing the signal strength of the target base station to the handover threshold parameter involves comparing the signal strength of the target base station to the sum of the offset and the serving base station signal strength. In any case, when comparing the strength of the target base station to the handover threshold parameter, the serving base station could decide to initiate handover of the UE only if the reported signal strength of the target base station is greater than the signal strength represented by the handover threshold parameter. Otherwise, the serving base station could decline to initiate handover of the UE to the target base station.

The target base station could take various forms. For example, the target base station could be a "relay base station" or a "non-relay base station." A non-relay base station, such as a typical macro base station including a tower-mounted antenna structure, could have a dedicated backhaul connection to the core network for supporting various types of traffic, such as bearer traffic and control signaling, to and from served UEs. A relay base station, on the other hand, could depend on a UE or a UE module, referred to as a "relay-UE," for providing a wireless backhaul connection to the network. As such, the wireless backhaul connection could be supported by, or overlaid on, an air interface connection between the relay-UE and the relay-UE's serving base station, referred to as a "donor base station." Thus, for a relay base station, the types of traffic usually supported on dedicated backhaul connections between a base station and the network could instead be supported on the wireless backhaul connection between the relay-UE and the donor base station.

In practice, a serving base station could initiate handover of a UE to a relay base station according to the processes described above, and the relay base station could then serve the UE via the relay base station's wireless backhaul connection. However, handing over the UE to a relay base station may not always be desirable, as it could result in poor service to the UE. For example, as noted above, in order for bearer data or control signaling to travel between the network and a UE served by a relay base station, such traffic could be sent over two distinct air interfaces—the air interface between the relay-UE and the donor base station and the air interface between the relay base station and the UE. This could add significant delay to the transmission of data between the network and the UE, particularly if the data transmission needs to be scheduled and carried out twice. Further, in some implementations, data sent to or from a UE served by a relay base station might also be routed through a relay gateway of the core network, thereby adding further delay to the transmission of such data.

Disclosed herein is a method and system to help manage UE handover based on consideration of these or other issues. As noted above, when a serving base station receives from a UE a measurement report indicative of signal strengths of the serving base station and of a target base station, the serving base station may compare the target base station signal strength to a handover threshold parameter and, based on the comparison, decide whether to initiate handover of the UE to the target base station. In accordance with the disclosure, the serving base station will determine whether the target base station is a relay base station or a non-relay base station, and, based at least in part on the result of that determination, the serving base station will determine what value to use as the handover threshold parameter in the comparison. For instance, if the target base station is a non-relay base station, then the serving base station may decide to use a first handover threshold parameter, which may be referred to as the default handover threshold parameter. On the other hand, if the target base station is a relay base station, then the serving base station may decide to use a different handover threshold parameter that is greater than the default handover threshold parameter.

In situations where the handover threshold parameter is defined as a fixed value, the serving base station could have two or more stored values of handover threshold parameters and could select one of the stored parameter values accordingly. For example, if the target base station is a non-relay base station, then the serving base station could select a lower (e.g., default) threshold parameter value, and if the target base station is a relay base station, then the serving base station could select a greater threshold parameter value.

Alternatively, in situations where the handover threshold parameter is defined based on the reported signal strength of the serving base station, the serving base station could have two or more stored offset values and could select and apply one of the offset values to the reported strength of the serving base station in order to determine the handover threshold parameter. For example, if the target base station is a non-relay base station, then the serving base station could determine the default threshold parameter by selecting and applying a lower (e.g., default) offset value to the serving base station signal strength, and if the target base station is a relay base station, then the serving base station could determine the greater threshold parameter by selecting and applying a greater offset value to the serving base station signal strength.

In any case, if the target base station is a relay base station, then the serving base station will compare the signal strength of the target base station to a handover threshold parameter having a greater value than it would have if the target base station is a non-relay base station. As such, this process could dissuade a serving base station from handing over a UE to a relay base station unless the UE detects particularly strong coverage from the relay base station (and/or particularly weak coverage from the serving base station). Thus, a network implementing this process may reduce the number of UEs handed over to relay base stations, thereby potentially reducing delays of traffic sent to and from these UEs.

In addition to considering whether a target base station is a relay base station or a non-relay base station, in some examples a serving base station may also take into account a load of the target base station when determining which handover threshold parameter to use. For instance, the serving base station could first determine whether the target base station is a relay base station. If the determination is that the target base station is a non-relay base station, then the serving base station could use the lower, default value as the handover threshold parameter, as described above. On the other hand, responsive to determining that the target base station is a relay base station, the serving base station could then determine whether the target base station serves a threshold high extent of traffic (e.g., a sufficiently large number of UEs or a sufficiently high quantity of data). Responsive to determining that both (i) the target relay station is a relay base station and (ii) the target base station serves the threshold high extent of traffic, the serving base station could set a greater value as the handover threshold parameter for comparison with the target base station signal strength.

Accordingly, in one respect, disclosed is a method of managing handover of a UE from a source base station serving the UE to a target base station. As disclosed, the method includes the source base station receiving from the UE a measurement report that specifies a signal strength of the target base station. Further, the method includes the source base station setting a value of a handover threshold parameter, with the set value of the handover threshold parameter being based at least in part on whether the target base station is a relay base station or a non-relay base station. The method then includes the source base station determining, based on the set value of the handover threshold parameter, that the specified signal strength of the target base station satisfies a handover condition, and, responsive to making such a determination, invoking handover of the UE from the source base station to the target base station.

In another respect, disclosed is a method of managing handover of a UE from a source base station serving the UE to a target base station. As disclosed, the method includes the source base station receiving from the UE a measurement report that specifies a signal strength of the target base station. Further, the method includes, responsive to receiving the measurement report, the source base station performing a handover threshold parameter setting process that includes making a determination of whether the target base station is a relay base station or a non-relay base station. If the determination is that the target base station is a non-relay base station, then the process includes setting a value of a handover threshold parameter to a first value. On the other hand, if the determination is that the target base station is a relay base station, then the process includes determining that the target base station serves a threshold high extent of traffic and, based on the target base station being a relay base station that serves the threshold high extent of traffic, setting the value of the handover threshold parameter to a second value that is greater than the first value.

Once the value of the handover threshold parameter has been set to either the first or second value, the method then includes the source base station determining, based on the set value of the handover threshold parameter, that the specified signal strength of the target base station satisfies a handover condition. Further, responsive to making such a determination, the method includes invoking handover of the UE from the source base station to the target base station.

In yet another respect, disclosed is a base station. As disclosed, the base station includes an antenna structure for engaging in air interface communication with UEs and a backhaul communication interface for engaging in backhaul communication on a core access network. Further, the base station includes a controller, including one or more processing units, non-transitory data storage, and program instructions stored in the data storage and executable by the one or more processing units to carry out various base station operations as described herein.

By way of example, the base station operations could include receiving via the antenna structure a measurement report from the UE, with the measurement report specifying a signal strength of a neighboring base station. Further, the base station operations could include determining whether the neighboring base station is a relay base station or a non-relay base station. Still further, the base station operations could include setting a value of a handover threshold parameter based at least in part on whether the neighboring base station is a relay base station or a non-relay base station. And the base station operations could include determining, based on the set value of the handover threshold parameter, that the specified signal strength of the neighboring base station satisfies a handover condition and, responsive to making such a determination, invoking handover of the UE from the source base station to the target base station.

These as well as other aspects, advantages, and alternatives will become apparent to those of ordinary skill in the art by reading the following detailed description, with reference where appropriate to the accompanying drawings. Further, it should be understood that the descriptions provided in this overview and below are intended to illustrate the invention by way of example only and not by way of limitation.

DETAILED DESCRIPTION

This description will discuss implementation by way of example in the context of an LTE network. It will be understood, however, that principles of the disclosure can extend to apply in other scenarios as well, such as with respect to other radio access protocols. Further, even within the context of LTE, variations from the details disclosed may be possible. For instance, elements, arrangements, and operations may be added, removed, combined, distributed, or otherwise modified. In addition, it will be understood that operations described as being performed by one or more entities may be implemented in various ways, such as by one or more processing units executing program instructions for instance.

Figure 1:
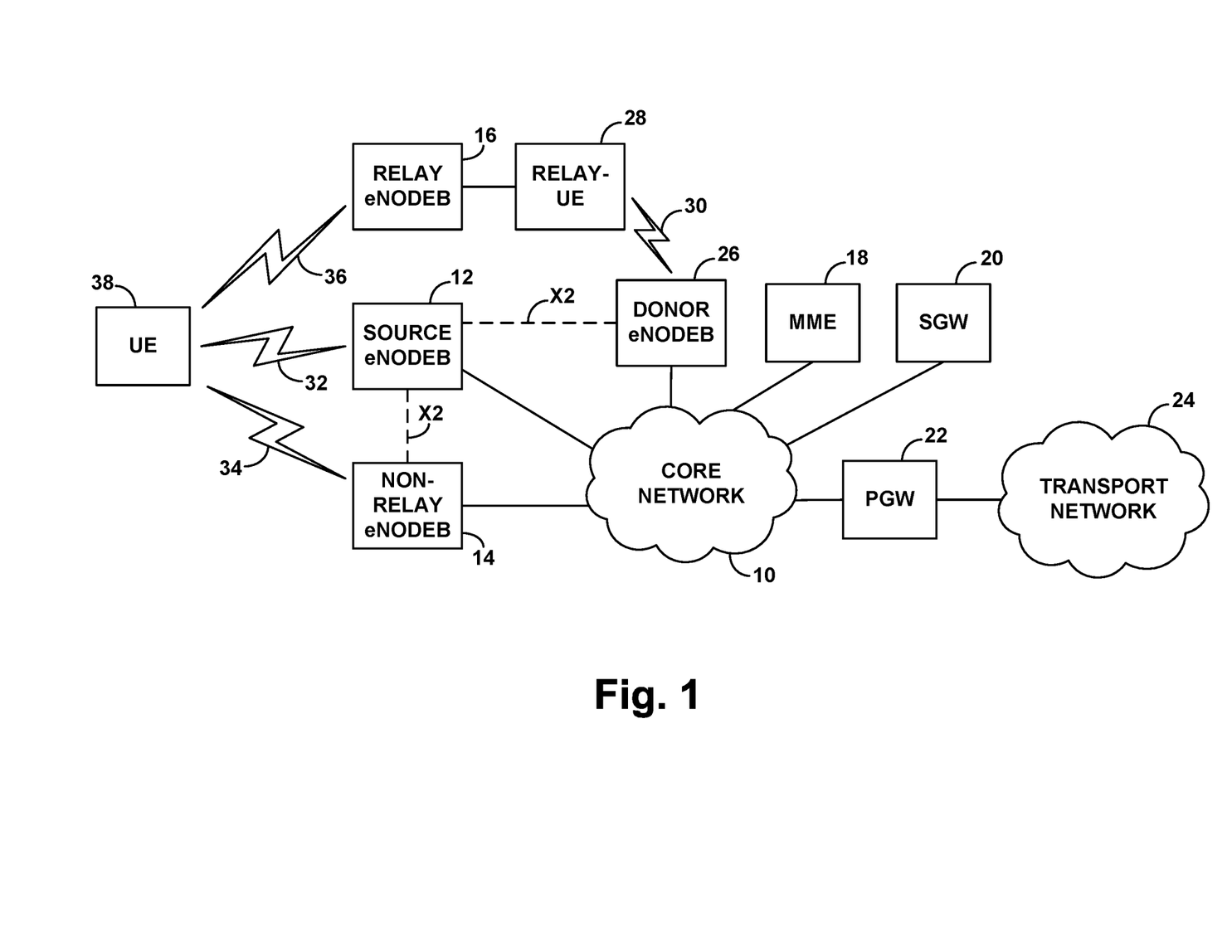
FIG. 1 is a simplified block diagram of an example wireless communication system in which features of the present disclosure can be implemented.

Referring to the drawings, as noted above, FIG. 1 is a simplified block diagram of a wireless communication system in which features of the present disclosure can be implemented. In particular, FIG. 1 depicts an example LTE network, which functions primarily to serve UEs with wireless packet data communication service, including possibly voice-over-packet service, but may also provide other functions. The LTE network may be implemented by a wireless service provider. As shown, the LTE network includes a core network 10 (or "evolved packet core (EPC)") which could be a packet-switched network, compliant with the industry standard system architecture evolution (SAE) for the LTE protocol, and thus the entities shown on the core network could each have an IP address and be configured to communicate with each other over packet-based tunnels or other communication interfaces, some of which could be dynamically configured as needed to serve individual UEs for instance.

As shown, sitting on the core network 10 are by way of example several LTE base stations 12, 14, and 16 referred to as evolved-Node-Bs (eNodeBs), as well as a mobility management entity (MME) 18, a serving gateway (SGW) 20, and a packet data network (PDN) gateway (PGW) 22, with the PGW then providing connectivity with a packet-switched transport network 24 such as the Internet.

Each of the eNodeBs 12, 14, and 16 is configured to provide a respective coverage area 32, 34, 36, such as a respective cell or sector, in which the eNodeB can serve UEs. As shown, eNodeB 14 is a non-relay eNodeB, and eNodeB 16 is a relay eNodeB. However, each of the eNodeBs 12, 14, and 16 could take various forms. For instance, an eNodeB could be a macro eNodeB of the type typically including a tower-mounted antenna structure and providing a broad range of coverage. Or an eNodeB could be a small-cell eNodeB or the like (e.g., a femtocell, relay, etc.) of the type typically having a smaller form factor and providing a narrower range of coverage.

In practice, each eNodeB could have communication interfaces with the MME 18 and the SGW 20 and could be configured to communicate with the MME 18 and the SGW 20 over those interfaces, and the SGW 20 could have communication interfaces with the PGW 22 and could be configured to communicate with the PGW 22 over those interfaces. Further, as shown in the figure, the eNodeBs could have communication interfaces, such as X2 interfaces, with each other and could be configured to communicate with each other over those interfaces.

For a relay eNodeB such as eNodeB 16, the communication interfaces with the MME 18, the SGW 20, and other eNodeBs could include a wireless backhaul connection with a donor eNodeB 26. In particular, relay eNodeB 16 could have a communication interface with a relay-UE 28 that is attached with and served by donor eNodeB 26 over an air interface 30 defining the wireless backhaul connection. With this arrangement, relay eNodeB 16 may engage in communication with various core network entities in the same way as a non-relay eNodeB such as eNodeB 14 would, but those communications would pass over the wireless backhaul connection provided by donor eNodeB 26 that serves the relay-UE 28, and between relay-UE 28 and relay eNodeB 16.

In addition, each eNodeB may broadcast in its coverage area a cell identifier to help distinguish its cell from nearby cells, and each eNodeB may further broadcast a reference signal that UEs can detect as a basis to evaluate coverage of the base station. In LTE, for instance, an eNodeB may broadcast its cell identifier (physical cell identifier (PCI)) by transmitting coded synchronization signals, and the eNodeB may broadcast its reference signal on certain defined air interface resource elements. When a UE is searching for coverage, the UE may thus detect the eNodeB's reference signal and evaluate coverage strength (e.g., reference signal receive power (RSRP) and/or reference signal receive quality (RSRQ) such as signal-to-noise ratio or the like), and the UE may determine the associated PCI of the detected cell.

FIG. 1 depicts a representative UE 38 within coverage of all three eNodeBs. When UE 38 first powers on or enters into coverage of the network, the UE may search for the strongest coverage it can find and, as noted above, may engage in a signaling process to register for service by the associated eNodeB. By way of example, we can assume that UE 38 detects a strongest reference signal from eNodeB 12 and thus engages in a process to register for service with eNodeB 12.

In a representative process, UE 38 may first engage in random-access signaling and radio-resource-control (RRC) configuration signaling with eNodeB 12 to establish an RRC connection as a radio-link-layer connection between UE 38 and eNodeB 12. Further, UE 38 may then engage in attach signaling via eNodeB 12 with MME 18, and MME 18 may facilitate authentication of UE 38 and coordinate establishment of one or more bearers between UE 38 and PGW 22, to enable UE 38 to engage in packet-data communication on transport network 24.

Once UE 38 is thus served by eNodeB 12, eNodeB 12 may then coordinate packet-data communication over the air to and from UE 38. For instance, when data arrives for UE 38 from network 24, PGW 22 may pass the data to SGW 20, SGW 20 may pass the data to eNodeB 12, and eNodeB 12 may then schedule and provide downlink transmission of the data over the air to UE 38. And when UE 38 has data to transmit on network 24, UE 38 may transmit a scheduling request over the air to eNodeB 12, eNodeB 12 may schedule uplink transmission of the data, UE 38 may transmit the data accordingly to eNodeB 12, and the data may pass to SGW 20 and to PGW 22, for transmission on network 24.

In addition, when UE 38 is served by eNodeB 12, UE 38 may receive from eNodeB 12, or otherwise be provisioned with, one or more measurement-events that define situations when UE 38 should transmit measurement reports to eNodeB 12 to facilitate possible handover. LTE defines several such measurement events, including (i) Event A3, which is triggered when a neighboring cell becomes better than the serving cell by a defined threshold offset, (ii) Event A4, which is triggered when a neighboring cell becomes better than a defined threshold level, and (iii) Event A5, which is triggered when the serving cell becomes worse than a threshold and a neighboring cell becomes better than a threshold. UE 38 may thus regularly evaluate coverage strength (e.g., RSRP and/or RSRQ) from serving eNodeB 12 as well as from other eNodeBs such as eNodeBs 14 and 16. And when UE 38 detects that a measurement event occurs, UE 38 may responsively transmit to serving eNodeB 12 a measurement report informing eNodeB 12 of the detected coverage strength(s) per detected PCI, to enable eNodeB 12 to process handover of UE 38 if appropriate.

When eNodeB 12 receives from UE 38 such a measurement report that establishes sufficiently strong coverage of one or more other eNodeBs (e.g., alone, or compared with the serving eNodeB), eNodeB 12 may responsively invoke a process to hand over UE 38 to the other eNodeB. Further, if the measurement report specifies that UE 38 detected threshold strong coverage from each of multiple other eNodeBs, eNodeB 12 may select the one reported eNodeB that has the higher reported coverage strength and may responsively invoke a process to hand over UE 38 to the selected eNodeB.

In a representative handover process, serving eNodeB 12 may transmit to the identified target eNodeB a handover request message, the target eNodeB may reserve resources to facilitate serving UE 38, serving eNodeB 12 and/or MME 18 may transfer one or more bearers to the target eNodeB, and serving eNodeB 12 may transmit to UE 38 a directive for UE 38 to transition from being served by eNodeB 12 to being served by the target eNodeB.

As noted above, when deciding whether to hand over a UE to a target eNodeB, a serving eNodeB may compare a signal strength (e.g., RSRP and/or RSRQ) of the target eNodeB to a handover threshold parameter. The handover threshold parameter could be defined in various ways. For instance, the handover threshold parameter could be defined as a fixed signal strength value (e.g., in dB or dBm) that is directly compared with the target eNodeB signal strength. Alternatively, the handover threshold parameter could be defined by applying an offset to a signal strength of the serving eNodeB, as detected by the UE. In any case, if the target eNodeB signal strength is greater than the signal strength represented by the handover threshold parameter, then the serving eNodeB could invoke handover of the UE to the target eNodeB.

To facilitate this, the UE may transmit to the serving eNodeB a measurement report indicating various eNodeB signal strengths, as detected by the UE. For example, the measurement report may specify the strength of a signal received by the UE from the target eNodeB and the strength of a signal received by the UE from the serving eNodeB. Further, the serving eNodeB may be provisioned with a set of signal strength parameters (e.g., in dB or dBm) that the serving eNodeB may refer to when setting a handover threshold parameter.

In practice, the serving eNodeB could set the handover threshold parameter in various ways. In some examples, the serving eNodeB could select one of the serving eNodeB's provided signal strength parameters as the handover threshold parameter. The serving eNodeB could then directly compare the target eNodeB signal strength to the selected parameter to determine whether to invoke handover of the UE. Alternatively, the serving eNodeB could instead select and apply one of the signal strength parameters as an offset to the reported signal strength of the serving eNodeB. As such, the value of the handover threshold parameter could be defined by the sum of the selected signal strength parameter and the serving eNodeB signal strength. The serving eNodeB could then compare the reported target eNodeB signal strength to this sum to determine whether to invoke handover of the UE.

As noted above, when setting a value of the handover threshold parameter for comparison with a signal strength of a target eNodeB, a serving eNodeB could consider whether the target eNodeB is a relay eNodeB or a non-relay eNodeB. For example, the signal strength parameters stored at the serving eNodeB could have a range of values ranging from a lowest signal strength to a greatest signal strength. If the target eNodeB is a non-relay eNodeB, then the serving eNodeB could select a signal strength parameter having a low value (e.g., any value other than the greatest signal strength) and treat this low value parameter as the handover threshold parameter. Alternatively, the serving eNodeB could add the low value parameter to the reported signal strength of the serving eNodeB and treat this sum as the handover threshold parameter.

On the other hand, if the target eNodeB is a relay eNodeB, then the serving eNodeB could select a signal strength parameter having a high value (e.g., any value greater than the low value) and treat this high value parameter as the handover threshold parameter. Alternatively, the serving eNodeB could add the high value parameter to the reported signal strength of the serving eNodeB and treat this sum as the handover threshold parameter.

The serving eNodeB may then hand over the UE to the target eNodeB only if the signal strength of the target eNodeB is greater than the signal strength represented by the handover threshold parameter. And because the serving eNodeB sets a greater value as the handover threshold parameter when the target eNodeB is a relay eNodeB, the UE would have to measure a stronger signal strength from a relay eNodeB than it would from a non-relay eNodeB in order for the serving eNodeB to invoke handover of the UE.

In practice, the serving eNodeB could be further configured to determine whether the target eNodeB is a relay eNodeB or a non-relay eNodeB, and it may do so in various ways. In some implementations, for instance, when the UE monitors coverage signal strength from the target eNodeB, the UE may receive from the target eNodeB a message including an indication of whether or not the target eNodeB is a relay eNodeB. By way of example, such a message could be a system message generally broadcast by the target eNodeB, such as a System Information Block (SIB) message. The UE may then read the message to determine whether or not the target eNodeB is a relay eNodeB and may then include an indication of whether or not the target eNodeB is a relay eNodeB in a measurement report or some other message sent to the serving eNodeB.

In other implementations, when monitoring the signal strength from the target eNodeB, the UE may receive or discern from the target eNodeB a PCI identifying the eNodeB as discussed above, and the UE may transmit the PCI to the serving eNodeB in a measurement report. The serving eNodeB may then be provisioned with data or logic to determine which type of eNodeB (e.g., a conventional, non-relay eNodeB, or a relay eNodeB) that the PCI identifies. For instance, the serving eNodeB may be provisioned with a table that correlates respective PCI values to respective types of eNodeBs, and may refer to the table to determine the type of eNodeB that the received PCI identifies.

Still in other implementations, the serving eNodeB may request and obtain from the target eNodeB a message that indicates whether the target eNodeB is a relay eNodeB or a non-relay eNodeB. By way of example, in response to receiving from the UE a measurement report identifying the target eNodeB, the serving eNodeB may send a message request through an X2 interface to the target eNodeB, and the target eNodeB may respond by sending a message indicating whether or not the target eNodeB is a relay eNodeB through an X2 interface to the serving eNodeB.

In any case, once the serving eNodeB has determined whether the target eNodeB is a relay eNodeB or a non-relay eNodeB, the serving eNodeB may set a value of a handover threshold parameter based on this determination as discussed above. The serving eNodeB may then compare the UE's measured signal strength of the target eNodeB to the set value of the handover threshold parameter and invoke handover of the UE to the target eNodeB only if the measured signal strength of the target eNodeB is a greater value than the set value of the handover threshold parameter.

As further noted above, another factor that a serving eNodeB can take into account when setting the value of the handover threshold parameter is load of the target eNodeB. For instance, responsive to determining that the target eNodeB is a relay eNodeB, the serving eNodeB may determine whether the target eNodeB is serving at least a threshold extent of traffic and take the result of this determination into account when setting the handover threshold parameter value. In particular, if the serving eNodeB determines both that the target eNodeB is a relay eNodeB and that the target eNodeB serves at least the threshold extent of traffic, then the serving eNodeB could set the handover threshold parameter to a value greater than the default handover threshold parameter value for comparison with the reported signal strength of the target eNodeB. Otherwise, the serving eNodeB could select the lower, default handover threshold parameter value for comparison with the reported signal strength of the target eNodeB.

To facilitate this, neighboring eNodeBs (eNodeBs that provide overlapping coverage) may exchange load information with each other, either regularly (e.g., periodically) or at the time handover between the eNodeBs becomes a possibility. In practice, for instance, a serving eNodeB may regularly request and obtain load information from neighboring eNodeBs to facilitate a handover decision when necessary, or the serving eNodeB may request and obtain load information from a candidate target eNodeB when considering handover to that eNodeB.

This load information exchange process may involve an exchange of binary coded load-information signaling messages between the eNodeBs, and based on these messages, the serving eNodeB may determine whether the target eNodeB is serving at least a threshold amount of traffic. For example, the target eNodeB may send to the serving eNodeB a load-information signaling message that specifies a quantity of UEs currently being served by the target eNodeB and/or that indicates a quantity of data that has been transferred, is currently being transferred, or is scheduled to be transferred between the target eNodeB and its served UEs. The specified quantity of data may include a total quantity of data transferred, an instantaneous transfer rate, or an average data transfer rate for a predetermined time period.

Based on the load-information signaling message, the serving eNodeB may determine whether the target eNodeB is serving a threshold high extent of data to its served UEs. For example, such a determination could involve determining whether the specified quantity of UEs served by the target eNodeB is greater than some predetermined value. In other examples, the determination could involve determining whether a total quantity of transferred data or a data transfer rate between the target eNodeB and its served UEs is greater than some predetermined value. In any case, the serving eNodeB may take into account the result of such a determination when setting the value of a handover threshold parameter for comparison with the reported signal strength of the target eNodeB.

In some implementations, the load information of a target eNodeB could include one or more of other various measurements such as air interface resource utilization, backhaul utilization, processor load, and/or one or more other load metrics now known or later developed. In such a case, the serving eNodeB could determine that the load of the target eNodeB is threshold high by determining that one or more of these measurements exceeds some predetermined value.

In the context of FIG. 1, the above-described processes may play out with eNodeB 12 receiving from UE 38 a measurement report indicating that the UE detected coverage of both eNodeBs 14 and 16. The measurement report may identify both eNodeBs 14 and 16 (e.g., by their PCIs) and may specify a signal strength that UE 38 detected from eNodeBs 12, 14, and 16. In some examples, the measurement report may further indicate whether each of eNodeBs 14 and 16 is a relay eNodeB or a non-relay eNodeB as determined by UE 38 based on system messages from the eNodeBs. In other examples, eNodeB 12 may determine whether each of eNodeBs 14 and 16 is a relay eNodeB or a non-relay eNodeB by referring to a look-up table that correlates respective PCIs of eNodeBs to respective types of eNodeBs. And if neither the measurement report nor the look-up table indicates a type of either eNodeB 14 or 16, eNodeB 12 may engage in X2 signaling with either eNodeB to determine whether the eNodeB is a relay eNodeB or a non-relay eNodeB. As shown in FIG. 1, eNodeB 12 would determine that eNodeB 14 is a non-relay eNodeB and eNodeB 16 is a relay eNodeB.

Further, eNodeB 12 may have been requesting load information from each of eNodeBs 14 and 16 or may request load information from each such eNodeB in response to the measurement report from UE 38. The load information may include a quantity of UEs served by each of eNodeBs 14 and 16 and/or a quantity of transferred data or a data transfer rate between each of eNodeBs 14 and 16 and their served UEs.

Once eNodeB 12 has determined whether each of eNodeBs 14 and 16 is a relay eNodeB or a non-relay eNodeB and once eNodeB 12 has received load information from each such eNodeB, eNodeB 12 may determine whether UE 38 detected sufficiently strong coverage from either or both of eNodeBs 14 and 16 to justify handover of the UE.

In particular, eNodeB 12 may set respective handover threshold parameter values for comparison with the respective signal strengths of eNodeBs 14 and 16. In line with the discussion above, when setting the respective handover threshold parameter values, eNodeB 12 may take into account whether each of eNodeBs 14 and 16 is a relay eNodeB or a non-relay eNodeB. Given that eNodeB 14 is a non-relay eNodeB, eNodeB 12 may set the handover threshold parameter to a first, default value representing a default signal strength and determine whether the reported signal strength of eNodeB 14 is high enough to justify handover of UE 38 based on the default value of the handover threshold parameter. Similarly, given that eNodeB 16 is a relay eNodeB, eNodeB 12 may set the handover threshold parameter to a different value that is greater than (e.g., that represents a greater signal strength than) the default value and determine whether the reported signal strength of eNodeB 16 is strong enough to justify handover of UE 38 based on the greater handover threshold parameter value.

In some implementations, when setting the values of the respective handover threshold parameters, eNodeB 12 may further consider whether each of eNodeBs 14 and 16 serve at least a threshold extent of traffic. For instance, even though eNodeB 16 is a relay eNodeB, eNodeB 12 may still be configured to set the handover threshold parameter to the default value for comparison with the reported signal strength of eNodeB 16 if eNodeB 12 determines that eNodeB 16 serves less than the threshold extent of traffic (e.g., by determining that eNodeB 16 serves less than a threshold number of UEs or that less than a threshold quantity of data is transferred between eNodeB 16 and its served UEs). On the other hand, if eNodeB 12 determines that eNodeB 16 serves at least the threshold extent of traffic, then eNodeB 12 may set the handover threshold parameter to a value that is greater than the default value for comparison with the reported signal strength of eNodeB 16. This is because, as noted above, eNodeB 12 may be configured to set the handover threshold parameter to a greater value when an eNodeB is determined to be both a relay eNodeB and serving a threshold high extent of traffic.

In any case, once eNodeB 12 has set the values of the respective handover threshold parameters, eNodeB 12 may determine whether to invoke handover of UE 38 to either of eNodeBs 14 and 16 based on the reported signal strengths of eNodeBs 14 and 16. Specifically, if the reported signal strength of eNodeB 14 is greater than the signal strength represented by the default handover threshold parameter, then eNodeB 12 may determine that handover of UE 38 is appropriate and may invoke the handover process described above to transition UE 38 from being served by eNodeB 12 to being served by eNodeB 14. If, on the other hand, the reported signal strength of eNodeB 14 is less than the signal strength represented by the default handover threshold parameter value, then eNodeB 12 may determine that handover of UE 38 is inappropriate and may continue to serve UE 38.

Similarly, eNodeB 12 may compare the reported signal strength of eNodeB 16 to the greater handover threshold parameter value. If the reported signal strength of eNodeB 16 is greater than the signal strength represented by the greater handover threshold parameter value, then eNodeB 12 may determine that handover of UE 38 is appropriate and may invoke the handover process described above to transition UE 38 from being served by eNodeB 12 to being served by eNodeB 16. If, on the other hand, the reported signal strength of eNodeB 16 is less than the signal strength represented by the greater handover threshold parameter value, then eNodeB 12 may determine that handover of UE 38 is inappropriate and may continue to serve UE 38.

In such a process, there may be some cases where eNodeB 12 determines that handover of UE 38 is appropriate for both eNodeBs 14 and 16. Under these circumstances, eNodeB 12 may responsively invoke handover of UE 38 to the eNodeB with a reported signal strength that exceeds its respective handover threshold parameter by a greater amount. In other examples, eNodeB 12 may be responsively invoke handover of UE 38 to whichever eNodeB is not a relay eNodeB (e.g., eNodeB 14 in this case).

Figure 2:
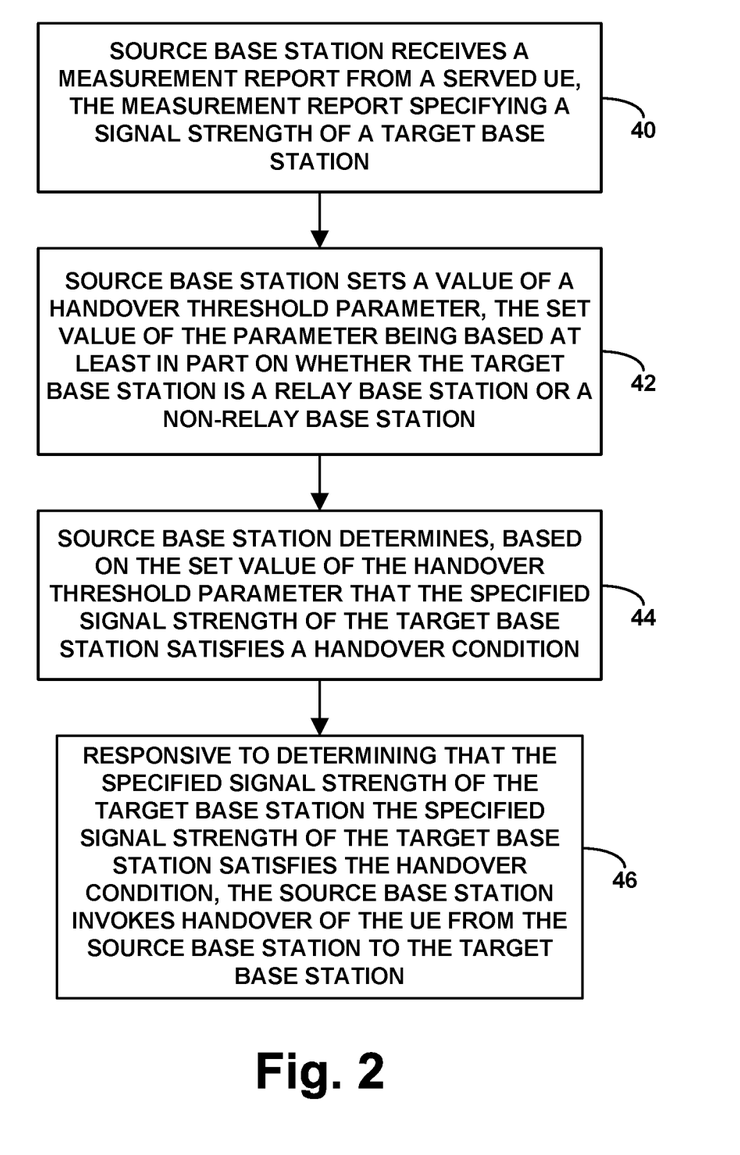
FIG. 2 is a flow chart depicting operations that can be carried out in accordance with the disclosure.

FIG. 2 is next a flow chart depicting operations that can be carried out by an eNodeB in accordance with the present disclosure, to control handover of a UE from the serving eNodeB to some other target eNodeB.

As shown in FIG. 2, at block 40, the method includes the serving base station (or source base station) receiving a measurement report from a served UE, with the measurement report specifying a signal strength of a target base station, as detected by the UE. At block 42, the method further includes the source base station setting a value of a handover threshold parameter, with the set value of the handover threshold parameter being based at least in part on whether the target base station is a relay base station or rather a non-relay base station.

At block 44, the method then includes the source base station determining, based on the set value of the handover threshold parameter, that the specified signal strength of the target base station satisfies a handover condition. In line with the discussion above, this may involve determining that the specified signal strength of the target base station is greater than a signal strength represented by the selected handover threshold parameter. And at block 46, the method includes the source base station invoking handover of the UE from the source base station to the target base station responsive to determining that the specified signal strength of the target base station satisfies the handover condition.

As discussed above, the act of setting a value of a handover threshold parameter could involve setting a lower, default value as the handover threshold parameter if the target base station is a non-relay base station and setting a value that is greater than the default value as the handover threshold parameter if the target base station is a relay base station. Further, the act of setting the default value as the handover threshold parameter could involve selecting a fixed default signal strength value, or the act could involve applying a default offset value to a signal strength of the source base station, as detected by the UE. Similarly, the act of setting the greater value as the handover threshold parameter could involve selecting a handover threshold parameter that has a fixed value greater than the default value, or the act could involve applying an offset value greater than the default offset value to the signal strength of the source base station.

Figure 3:
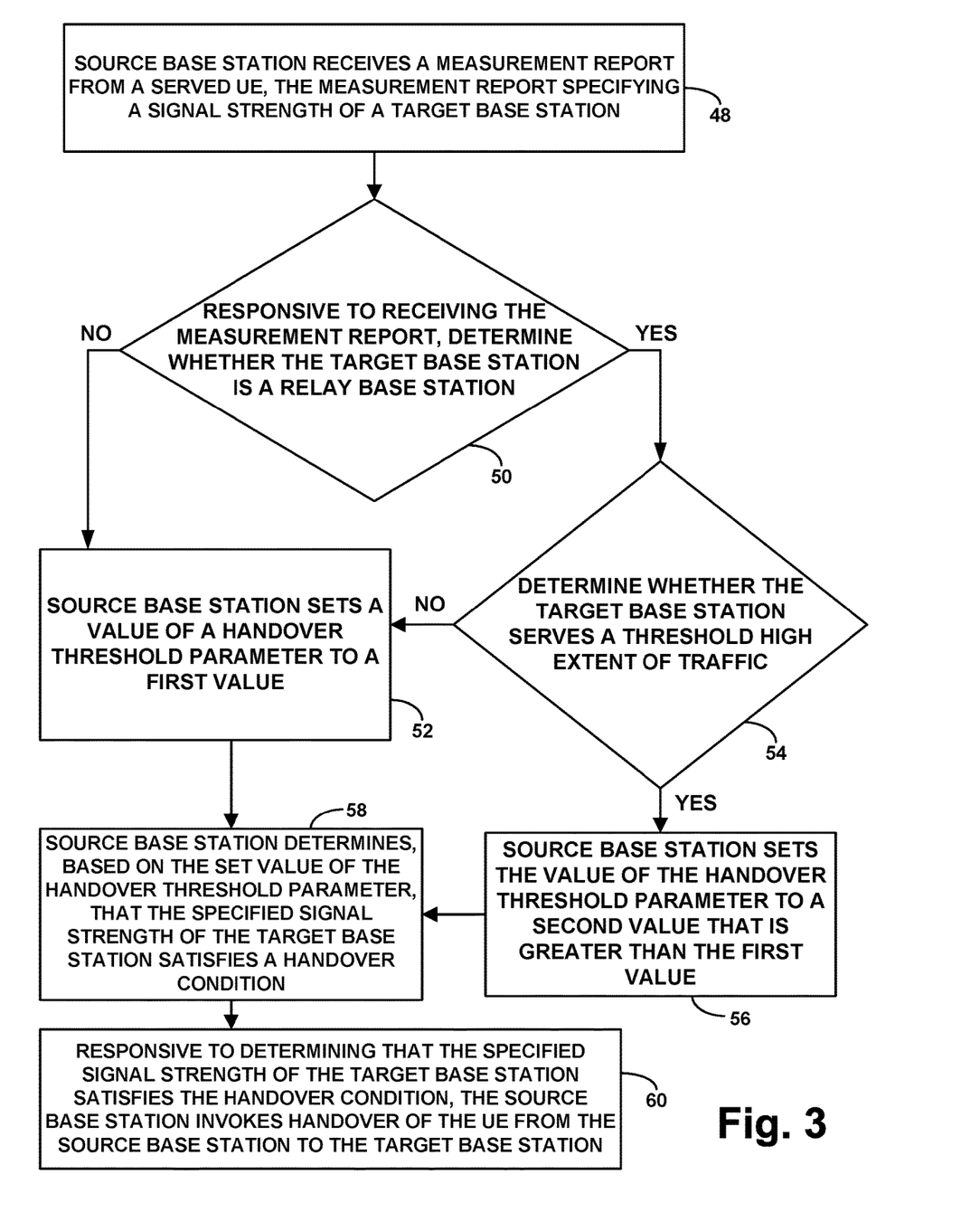
FIG. 3 is another flow chart depicting operations that can be carried out in accordance with the disclosure.

FIG. 3 is next another flow chart depicting operations that can be carried out by an eNodeB in accordance with the present disclosure, to control handover of a UE from the serving eNodeB to some other target eNodeB.

As shown in FIG. 3, at block 48, the method includes the serving base station (or source base station) receiving a measurement report from a served UE, with the measurement report specifying a signal strength of a target base station, as detected by the UE. At block 50, the method further includes, responsive to receiving the measurement report, the source base station determining whether the target base station is a relay base station rather than a non-relay base station. If the determination is that the target base station is a non-relay base station, then the method involves the source base station setting a value of a handover threshold parameter to a first value, as shown at block 52. On the other hand, if the determination is that the target base station is a relay base station, then the method involves the source base station determining whether the target base station serves a threshold high extent of traffic, as shown at block 54.

At block 54, if the determination is that the target base station does not serve the threshold high extent of traffic, then the method involves the source base station setting the value of the handover threshold parameter to the first value, as shown at block 52. On the other hand, if the determination is that the target base station does serve the threshold high extent of traffic, then the method involves the source base station setting the value of the handover threshold parameter to a second value that is greater than the first value, as shown at block 56.

Once the value of the handover threshold parameter has been set, either at block 52 or 56, the method involves the source base station determining, based on the set value of the handover threshold parameter, that the specified signal strength of the target base station satisfies a handover condition, as shown at block 58. In line with the discussion above, this may involve determining that the specified signal strength of the target base station is greater than a signal strength represented by the selected handover threshold parameter. And at block 60, the method includes the source base station invoking handover of the UE from the source base station to the target base station responsive to determining that the specified signal strength of the target base station satisfies the handover condition.

Note that numerous features described above can apply in the context of this method, and numerous aspects of this method context apply in the context of methods described above. By way of example, the act of setting the value of the handover threshold parameter to the first value could involve selecting a default handover threshold parameter that has a fixed value, or the act could involve applying a default offset value to a signal strength of the source base station, as detected by the UE. Similarly, the act of setting the value of the handover threshold parameter to the second value could involve selecting a handover threshold parameter that has a fixed value greater than the default handover threshold parameter, or the act could involve applying an offset value greater than the default offset value to the signal strength of the source base station. Further, the act of determining whether the target base station is a relay base station or a non-relay base station could involve making such a determination based on an indication from the UE in the measurement report, based on an identifier (e.g., a PCI) of the target base station, or based on inter-base station communications (e.g., X2 signaling) between the source base station and the target base station. Other examples are possible as well.

Figure 4:
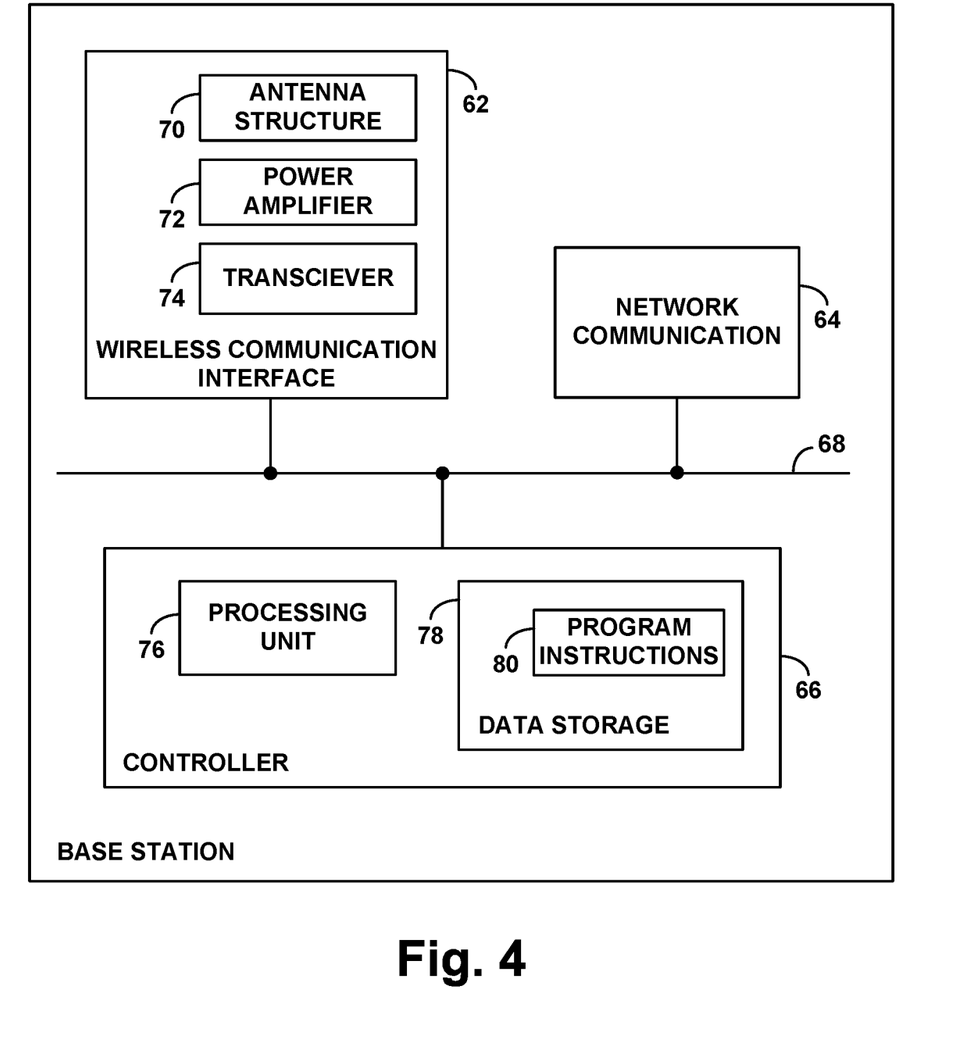
FIG. 4 is a simplified block diagram of a base station operable in the disclosed system.

Finally, FIG. 4 is a simplified block diagram of an example base station, showing some of the components that each of the base stations in FIG. 1 could include in an example implementation. As shown in FIG. 4, the base station includes a wireless communication interface 62, a network communication interface 64, and a controller 66. These components are shown communicatively linked together by a system bus or other communication link 68, but it will be understood that the components could alternatively be integrated together or distributed in various ways. For instance, aspects of the controller 66 could be provided in a chipset that implements functions of the wireless communication interface 62. Other examples are possible as well.

As shown, wireless communication interface 62 could include an antenna structure (e.g., one or more antennas) 70, which, together with a power amplifier 72 and a transceiver 74, facilitates air interface communication (transmitting and receiving), so that the base station can serve one or more UEs via the wireless communication interface. Network communication interface 64 could then include a wired or wireless network interface, such as an Ethernet interface, through which the base station could communicate with other entities via a core network or the like.

And controller 66 could include a processing unit (one or more processors) 76, non-transitory data storage 78, and program instructions 80 stored in the non-transitory data storage and executable by the processing unit to carry out various operations described herein. For instance, the controller could be thus configured to cause the base station to carry out the operations of (i) receiving via the antenna structure 70 a measurement report from the UE, wherein the measurement report specifies a signal strength of a neighboring base station, (ii) determining whether the neighboring base station is a relay base station or a non-relay base station, (iii) setting a value of a handover threshold parameter based at least in part on whether the neighboring base station is a relay base station or a non-relay base station, (iv) determining, based on the set value of the handover threshold parameter, that the specified signal strength of the neighboring base station satisfies a handover threshold condition, and (v) based on the specified signal strength of the neighboring base station satisfying the handover condition, invoking handover of the UE to the neighboring base station. Further, other operations, factors, and features described above could be carried out in this context as well.

Exemplary embodiments have been described above. Those skilled in the art will understand, however, that changes and modifications may be made to these embodiments without departing from the true scope and spirit of the invention.

What is claimed is:

1. A method of managing handover of a user equipment device (UE) from a source base station serving the UE to a target base station, the method comprising:
    receiving a measurement report from the UE, wherein the measurement report specifies a signal strength of the target base station;
    determining, based on the measurement report from the UE, that the target base station is a relay base station rather than a non-relay base station;
    setting a value of a handover threshold, wherein the base station is configured by default to set the handover threshold to a first default value, and wherein setting the value of the handover threshold comprises setting the handover threshold to a second value different from the first default value based at least in part on the determination that the target base station is a relay base station rather than a non-relay base station;
    determining, based on the set value of the handover threshold, that the specified signal strength of the target base station satisfies a handover condition; and
    responsive to determining that the specified signal strength of the target base station satisfies the handover condition, invoking the handover of the UE from the source base station to the target base station.

2. The method of claim 1, wherein the second value is higher than the first default value.

3. The method of claim 1, wherein the measurement report further specifies a signal strength of the source base station, and wherein setting the value of the handover threshold comprises applying an offset to the signal strength of the source base station, wherein the offset represents how much higher than the signal strength of the source base station the signal strength of the target base station needs to be to invoke handover of the UE from the source base station to the target base station.

4. The method of claim 3, wherein setting the handover threshold to the first default value comprises applying a first offset value to the signal strength of the source base station, and wherein setting the handover threshold to the second value comprises applying a second offset value that is higher than the first offset value to the signal strength of the source base station.

5. The method of claim 1, wherein determining that the specified signal strength of the target base station satisfies the handover condition comprises determining that the specified signal strength of the target base station is greater than the set handover threshold value.

6. The method of claim 1, wherein the setting comprises setting the value of the handover threshold responsive to determining that the target base station is a relay base station rather than a non-relay base station.

7. The method of claim 1, wherein the measurement report further specifies an identifier of the target base station, and wherein the source base station determines, based on the specified identifier, that the target base station is a relay base station rather than a non-relay base station.

8. The method of claim 1, further comprising determining a number of UEs served by the target base station, wherein setting the value of the handover threshold comprises setting the handover threshold to the second value based on both (i) the determination that the target base station is a relay base station rather than a non-relay base station and (ii) the determined number of UEs.

9. The method of claim 1, further comprising determining a quantity of data communicated between the target base station and one or more UEs served by the target base station, wherein setting the value of the handover threshold comprises setting the handover threshold to the second value based on both (i) the determination that the target base station is a relay base station rather than a non-relay base station and (ii) the determined quantity of data.

10. A method of managing handover of a user equipment device (UE) from a source base station serving the UE to a target base station, the method comprising:
    receiving a measurement report from the UE, wherein the measurement report specifies a signal strength of the target base station;
    responsive to receiving the measurement report, performing a handover threshold setting process comprising:
        (a) determining, based on the measurement report, that the target base station is a relay base station rather than a non-relay base station,
        (b) determining that the target base station serves a threshold high extent of traffic, and
        (c) setting a value of a handover threshold, wherein the base station is configured by default to set the handover threshold to a first default value, and wherein setting the value of the handover threshold comprises setting the handover threshold to a second value different from the first default value based on the target base station being a relay base station that serves the threshold high extent of traffic;
    determining, based on the set value of the handover threshold, that the specified signal strength of the target base station satisfies a handover condition; and
    responsive to determining that the specified signal strength of the target base station satisfies the handover condition, invoking the handover of the UE from the source base station to the target base station.

11. The method of claim 10, wherein the measurement report further specifies a signal strength of the source base station, and wherein setting the value of the handover threshold comprises applying an offset to the signal strength of the source base station, wherein the offset represents how much higher than the signal strength of the source base station the signal strength of the target base station needs to be to invoke handover of the UE from the source base station to the target base station.

12. The method of claim 10, wherein determining that the specified signal strength of the target base station satisfies the handover condition comprises determining that the specified signal strength of the target base station is greater than the set handover threshold value.

13. The method of claim 10, wherein the measurement report further specifies an identifier of the target base station, and wherein the source base station determines, based on the specified identifier, that the target base station is a relay base station rather than a non-relay base station.

14. The method of claim 10, wherein determining that the target base station serves the threshold high extent of traffic comprises determining that a number of UEs served by the target base station is threshold high, and wherein the setting comprises setting the value of the handover threshold to the second value based on both (i) the target base station being a relay base station rather than a non-relay base station and (ii) the target base station serving the threshold high number of UEs.

15. The method of claim 10, wherein determining that the target base station serves the threshold high extent of traffic comprises determining that a quantity of data communicated between the target base station and one or more UEs served by the target base station is threshold high, and wherein the setting comprises setting the value of the handover threshold to the second value based on both (i) the target base station being a relay base station rather than a non-relay base station and (ii) the target base station communicating the threshold high quantity of data between the target base station and the one or more UEs.

16. A base station comprising:
an antenna structure for engaging in air interface communication with user equipment devices (UEs);
a backhaul communication interface for engaging in backhaul communication on a core access network; and
a controller configured to control a handover of a UE served by the base station, wherein the controller is configured to:
receive via the antenna structure a measurement report from the UE, wherein the measurement report specifies a signal strength of a neighboring base station,
determine, based on the measurement report from the UE, that the neighboring base station is a relay base station rather than a non-relay base station,
set a value of a handover threshold, wherein the controller is configured by default to set the handover threshold to a first default value, and wherein setting the value of the handover threshold comprises setting the handover threshold to a second value different from the first default value based at least in part on the determination that the neighboring base station is a relay base station rather than a non-relay base station,
determine, based on the set value of the handover threshold, that the specified signal strength of the neighboring base station satisfies a handover condition, and
based on the specified signal strength of the neighboring base station satisfying the handover condition, invoke handover of the UE to the neighboring base station.

17. The base station of claim 16, wherein the second value is higher than the first default value.

18. The base station of claim 16, wherein the controller is further configured to determine an extent of traffic served by the neighboring base station, and wherein setting the value of the handover threshold comprises setting the handover threshold to the second value based on both (i) the determination that the neighboring base station is a relay base station rather than a non-relay base station and (ii) the determined extent of traffic.

19. The base station of claim 18, wherein determining the extent of traffic served by the neighboring base station comprises receiving via the backhaul communication interface a report indicating a number of UEs served by the neighboring base station, and wherein setting the value of the handover threshold to the second value based on the determined extent of traffic comprises setting the value of the handover threshold to the second value based on the indicated number of UEs.

20. The base station of claim 18, wherein determining the extent of traffic served by the neighboring base station comprises receiving via the backhaul communication interface a report indicating a quantity of data communicated between the neighboring base station and one or more UEs served by the neighboring base station, and wherein setting the value of the handover threshold to the second value based on the determined extent of traffic comprises setting the value of the handover threshold to the second value based on the indicated quantity of data.

* * * * *